(12) United States Patent
Diehl

(10) Patent No.: US 9,583,269 B2
(45) Date of Patent: Feb. 28, 2017

(54) INDUCTOR FOR HEATING ULTRAHEAVY OIL AND OIL SAND DEPOSITS

(71) Applicant: Dirk Diehl, Bubenreuth (DE)

(72) Inventor: Dirk Diehl, Bubenreuth (DE)

(73) Assignee: Siemens Aktiengesellschaft, München (DE)

(*) Notice: Subject to any disclaimer, the term of this patent is extended or adjusted under 35 U.S.C. 154(b) by 96 days.

(21) Appl. No.: 14/432,171

(22) PCT Filed: Jun. 19, 2013

(86) PCT No.: PCT/EP2013/062783
§ 371 (c)(1),
(2) Date: Mar. 27, 2015

(87) PCT Pub. No.: WO2014/048593
PCT Pub. Date: Apr. 3, 2014

(65) Prior Publication Data
US 2015/0279571 A1 Oct. 1, 2015

(30) Foreign Application Priority Data

Sep. 28, 2012 (DE) .................... 10 2012 217 813
Dec. 18, 2012 (DE) .................... 10 2012 223 559

(51) Int. Cl.
*H01G 4/28* (2006.01)
*H01G 4/40* (2006.01)
(Continued)

(52) U.S. Cl.
CPC ............ *H01G 4/40* (2013.01); *E21B 43/2401* (2013.01); *E21B 43/2408* (2013.01); *H01G 4/28* (2013.01); *H01G 4/385* (2013.01); *H05B 2214/03* (2013.01)

(58) Field of Classification Search
CPC ........................................................ H01G 4/28
See application file for complete search history.

(56) References Cited

U.S. PATENT DOCUMENTS

| 3,505,575 A | 4/1970 | Barbini |
| 6,046,091 A * | 4/2000 | Quick ............... H01G 4/28 438/396 |

(Continued)

FOREIGN PATENT DOCUMENTS

| DE | 889178 C | 9/1953 |
| DE | 3042777 A1 | 5/1982 |

(Continued)

OTHER PUBLICATIONS

Russian Decision on grant for related Russian Application No. 2015115918107 dated Apr. 20, 2016, with English Translation.

(Continued)

*Primary Examiner* — Dion R Ferguson
(74) *Attorney, Agent, or Firm* — Lempia Summerfield Katz LLC

(57) ABSTRACT

The invention relates to a plug element (10), in particular for producing capacitors (C), which comprises three sections (1, 2, 3) in the direction of its longitudinal extent, wherein a first section (1) has a tapered shape at one end of the plug element (10), said tapered shape complementing a shape of a third section (3) at that end of the plug element (10) which is averted from the first section (1), and wherein a second section (2) is arranged between the first and the third section (1, 3), said second section connecting the first and the third section (1, 3) to one another. The invention also relates to a plug system (100) comprising plug elements (10) by means of which (cylindrical) capacitors (C) can be created, wherein electrically conductive layers (L1, D, L2, U) of the capacitor (C) which is formed from the plug system (100) simultaneously form a conduction structure of an inductor.

18 Claims, 3 Drawing Sheets

(51) Int. Cl.
*E21B 43/24* (2006.01)
*H01G 4/38* (2006.01)

(56) References Cited

U.S. PATENT DOCUMENTS

| | | | |
|---|---|---|---|
| 7,850,467 B2 | 12/2010 | Heinzig et al. | |
| 2009/0130871 A1 | 5/2009 | Heinzig et al. | |
| 2014/0160628 A1* | 6/2014 | Doyle | B82Y 10/00 361/324 |
| 2015/0043261 A1* | 2/2015 | Koshi | H02M 7/003 363/131 |
| 2015/0213954 A1* | 7/2015 | Matz | H01G 4/28 361/301.4 |

FOREIGN PATENT DOCUMENTS

| | | |
|---|---|---|
| DE | 9400877 U1 | 5/1994 |
| DE | 202007005696 U1 | 8/2008 |
| DE | 102007040605 B3 | 10/2008 |
| DE | 102010043758 A1 | 5/2012 |
| RU | 2416133 C2 | 4/2011 |
| SU | 790030 A1 | 12/1980 |
| SU | 875490 A1 | 10/1981 |
| WO | WO2009027305 A2 | 3/2009 |

OTHER PUBLICATIONS

German Search Report for German Application No. 10 2012 223 559.0, mailed Feb. 7, 2014, with English Translation.
PCT International Search Report and Written Opinion of the International Searching Authority dated Jul. 21, 2014 for corresponding PCT/EP2013/062783.

* cited by examiner

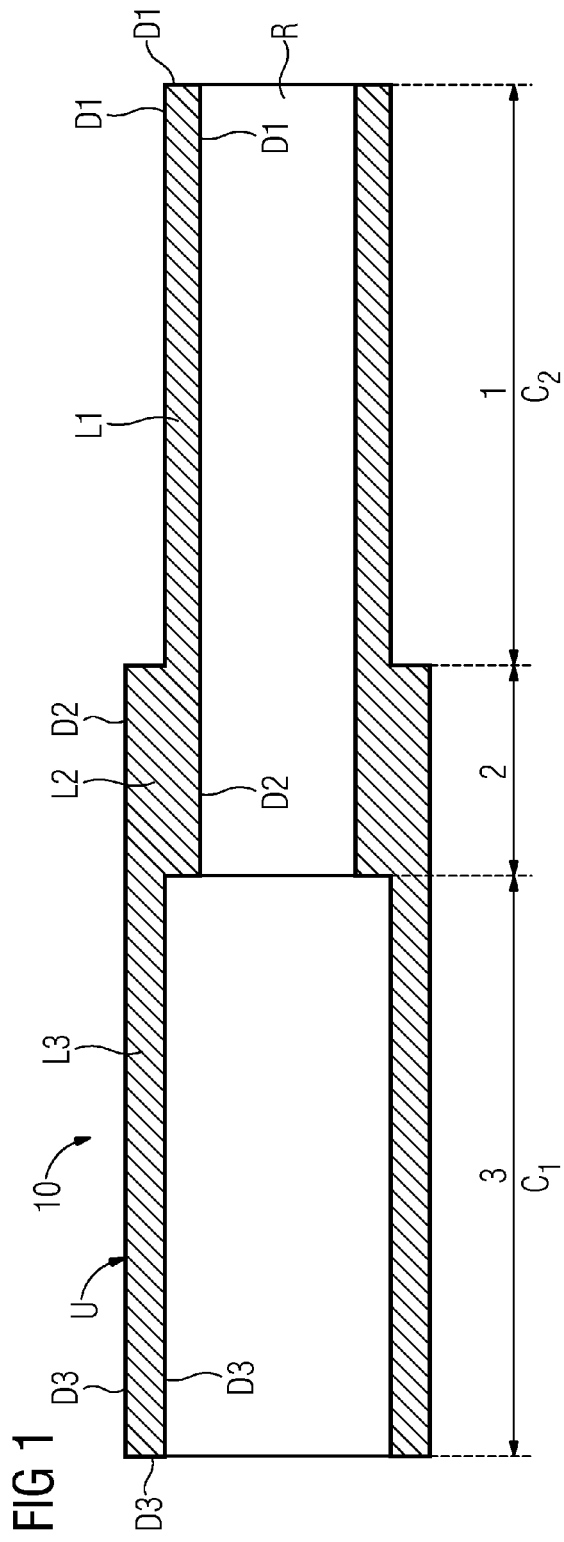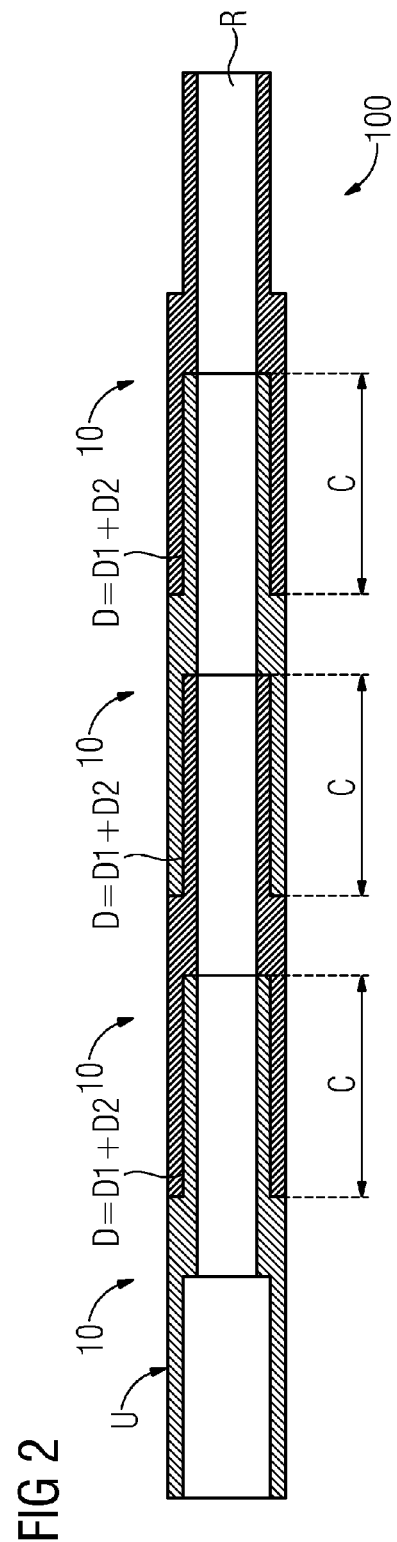

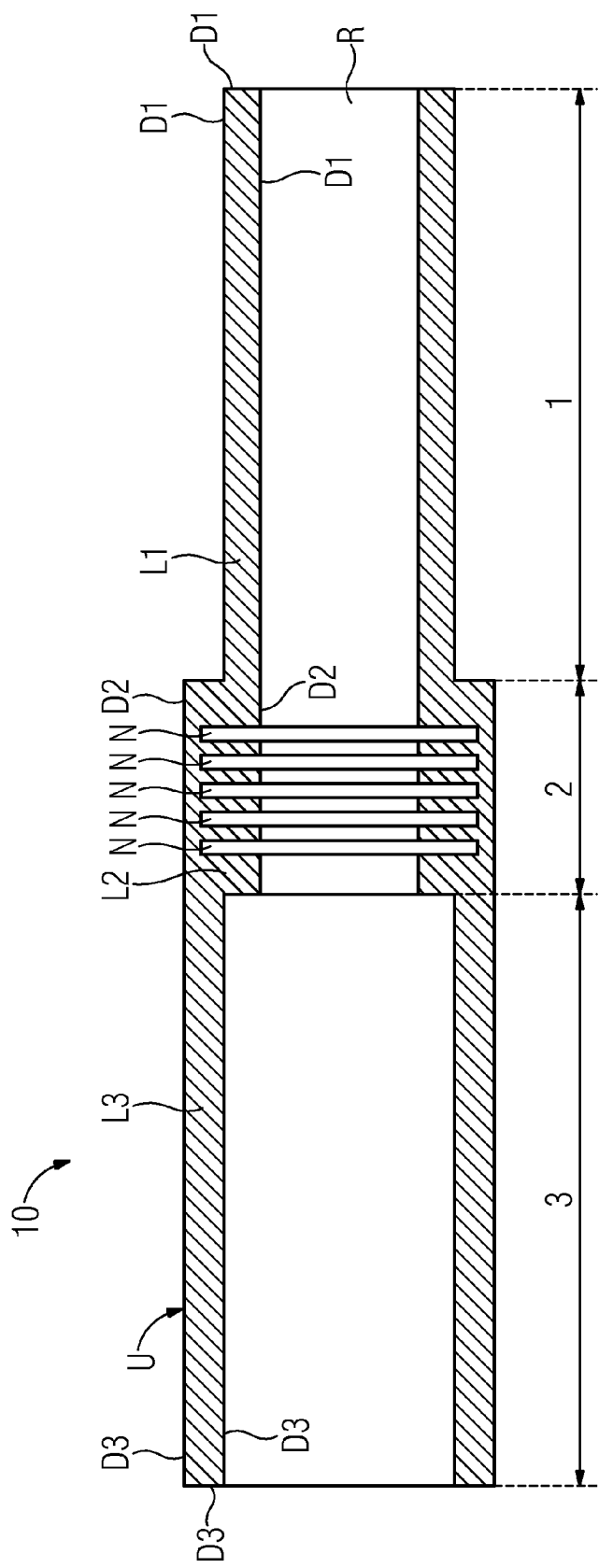

INDUCTOR FOR HEATING ULTRAHEAVY OIL AND OIL SAND DEPOSITS

This application is the National Stage of International Application No. PCT/EP2013/062783, filed Jun. 19, 2013, which claims the benefit of German Patent Application No. DE 10 2012 217 813.9, filed Sep. 28, 2012, and German Patent Application No. DE 10 2012 223 559.0, filed Dec. 18, 2012. The entire contents of these documents are hereby incorporated herein by reference.

BACKGROUND

The present embodiments relate to a plug element and also to a plug system that may be plugged together therewith.

In order to convey extra-heavy oils or bitumen from oil sand or oil shale reserves by pipe systems that are introduced into the deposits by drilling, the flowability of the oils is to be considerably increased. This may be achieved by increasing the temperature of the reserve (e.g., reservoir), for example, by a steam assisted gravity drainage (SAGD) method.

In the case of the SAGD method, steam, to which solvent may be added, is pressed under high pressure through a pipe running horizontally within the reservoir. The heated, molten bitumen separated from the sand or rock seeps to a second pipe, placed approximately 5 m deeper, through which the liquefied bitumen is conveyed. The steam is to perform a number of tasks simultaneously (e.g., to produce the introduction of the heat energy for liquefaction, the separation from sand, and also the pressure build-up in the reservoir in order to make the reservoir geomechanically permeable for bitumen transport (permeability) and in order to enable the bitumen to be conveyed without additional pumps).

In addition to the SAGD method or instead of this method, an inductive heater may be used in order to assist or convey extra-heavy oils or bitumen.

The electromagnetically inductive heater includes a conductor loop that is placed in the reservoir and, when energized, induces eddy currents in the surrounding earth. The induced eddy currents heat the earth. In order to achieve the desired heat output densities of typically 1-10 kW per meter of inductor length, depending on the conductivity of the reservoir, amperages of several hundreds of amps are applied at frequencies of typically 20-100 kHz. For compensation of an inductive voltage drop along the conductor loop, capacitors are interposed. A series resonant circuit that is operated at the resonance frequency thereof and constitutes a purely ohmic load at the terminals is thus produced. Without these series capacitors, the inductive voltage drop of the conductor loops, which are up to a few hundred meters long, would add up from tens of kV to more than 100 kV at the connection terminals, which may hardly be managed, for example, with respect to the insulation with respect to the earth. There would have to be a compensation of the reactive power at or in the generator (e.g., oscillator).

The problem of capacitively compensated inductors with plastic-based insulation or dielectric systems lies in the upwardly limited operating temperature range. The voltage and partial discharge resistance reduces considerably when temperatures of approximately 150° C. are reached or exceeded. Whereas in the case of heavy oil reservoirs, a temperature increase of up to 50° C., for example, may be sufficient to considerably accelerate the conveyance, in the case of bitumen (e.g., oil sand) reservoirs, higher temperatures (e.g., > 100° C.) are generally necessary. In the case of hybrid methods (e.g., SAGD assisted by inductive heating, or EM-SAGD), steam from an injector or a swelling steam chamber reaches the inductor, such that temperatures above 200° C. may be present at the inductor. These temperatures may result in voltage breakdowns or partial discharges.

Capacitively compensated inductors with concentrated, ceramic-based capacitors for increased temperature resistance for inductive heating of heavy oil and oil sand deposits is an inductor having mechanically rigid concentrated capacitors, which are connected by flexible externally insulated pipes, are already known. The necessary temperature resistance is to be achieved by the use of ceramic-based capacitors. The same demand, however, on the electrical insulation properties is also placed on the external insulation of the pipes. Since, however, the external insulation does not simultaneously have the function of a dielectric, the layer thickness may be increased. However, the demand with regard to temperature resistance and flexibility remains.

In addition, distributed capacitors based on coaxial line structures are known. Resonance lengths around 10 m or greater and capacitor portions with 1-2 m length are formed. To this end, a separate external insulation is to be provided.

DE 20 2007 005 696 U1 discloses a tubular structural component for producing line, shafts, pipe fittings and the like for receiving aggressive liquids or vapors, including a pipe shaft and end-face pipe ends. The ends are designed in a manner complementary to adjacent pipes in order to produce a tight connection thereto. The pipe shaft consists of a cement-bonded concrete, and the pipe ends consist of a concrete that is resistant to chemicals. The pipe shaft, on the inner periphery thereof, has a layer that is resistant to chemicals. The concrete, which is resistant to chemicals, of the pipe ends adjoins the layer resistant to chemicals in each case in a closed peripheral contact joint. Units for increasing the flow resistance are arranged in the contact joint, are connected tightly to the layer resistant to chemicals, and are connected tightly to the concrete resistant to chemicals.

A double-chamber pipe system for rainwater collection systems is known from DE 94 00 877 U1. The double-chamber pipe system includes various double-chamber elements, such as a transition piece/connection piece, straight pipe, vertical curve, horizontal curve and branch piece. The shaping, dimensions, and material nature of the double-chamber elements resemble conventional pipe elements with sleeves and ring seals but in the inner region, have a partition wall halving the inner diameter. The inflow of rainwater to the container is controlled in the upper chamber, and the return flow/overflow of the rainwater from the container into the conventional sewer system is controlled in the lower chamber.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a device of suitable design for electrically or electromagnetically heating a reservoir of an oil sand deposit is provided.

In one embodiment, a plug system includes a plurality of plug elements for producing capacitors. The respective plug element in a direction of longitudinal extent thereof includes three portions (e.g., a first portion, a second portion, and a third portion). The first portion at one end of the plug element has a tapered shape, that is complementary to a shape of the third portion at the end of the plug element remote from the first portion. The second portion is arranged between the first portion and the third portion and interconnects the first portion and the third portion. Using the plug element, individual components may be built modularly when a plurality of identical plug elements are joined together. In anticipation of the following embodiments, electrical components (e.g., capacitors of variable physical size and capacitance) may be "plugged together" in an advantageous manner.

At least two plug elements may be plugged together to form a plug system, in that in each case a first portion of a plug element may be plugged into a third portion of a further plug element, and so on. Depending on requirements, components of variable size and properties may thus be "plugged together."

The plug elements may be plugged together to form a capacitor of variable size and capacitance. The individual layers arranged coaxially with one another of the plug system formed by the plug elements include at least two layers of electrically conductive material, between each of which a layer of dielectric material is arranged. Capacitors of almost any "size" may thus be produced (e.g., capacitors that are suitable for a compensation of inductances that occur at amperages of a few hundred A at frequencies of approximately 20-100 kHz as in the above-described method for heating oil reservoirs).

When designing capacitively compensated inductors with plastic insulation systems, the considerably reduced voltage and partial discharge resistance at higher temperatures is to be taken into consideration. This may be implemented by considerably reducing the voltages occurring across the capacitors. The number of capacitors connected in series is to be increased such that the total inductive voltage drop is distributed between so many capacitors that the voltage limit reduced on account of the increased temperature is observed. The series connection of more capacitors, however, reduces the overall capacitance, which is to be compensated by increased capacitance of the individual capacitor when the operating frequency (e.g., resonance frequency) is to be held constant.

In the case of distributed capacitors, which utilize the capacitance between conductor groups, this leads to an increased cross section of the line with accordingly increased material use. The number of interruptions due to reduced resonance lengths increases, which is associated with further increased production outlay.

In one embodiment, a plurality of plug elements, which may be plugged together to form a capacitor of variable size and capacitance, simultaneously form a line structure of an inductor. A universal concept for producing an electric or electromagnetic heater of a reservoir of an oil sand deposit may thus be created.

One or more of the present embodiments also include a plug element for the plug system.

In an embodiment, the plug element in the direction of longitudinal extent thereof has a through-opening from the end of the first portion to the end, remote therefrom, of the third portion. "Hollow" components (e.g., pipes) may thus be produced in a simple manner.

The plug element may be rotationally symmetrical. In this way, shapes and components with which identical physical properties may be impressed (e.g., in the radial direction), as is necessary with many components, may be produced.

In accordance with this purpose, individual portions of the plug element have a plurality of layers of different material type arranged coaxially with one another, which differ in portions in terms of number.

In a further embodiment, the coaxially arranged layers of the first portion and the coaxially arranged layers of the third portion supplement one another to form the respective layers of the second portion arranged coaxially with one another (e.g., in layer sequence and thickness of the selected material). By way of example, cylindrical capacitors, depending on the arrangement and material selection of the coaxial layers, may thus be plugged together to form a "large" component.

With a suitable embodiment of the plug element, radial bores may be provided in the second portion of the plug element. Since the second portion is generally thicker in terms of the "wall" thickness thereof compared with the two other portions of the plug element, the second portion is also mechanically more stable. The second portion, also referred to as the middle portion, is thus suitable for receiving bores or recesses thereon.

In a further embodiment, radial grooves are provided in the second portion of the plug element and may be filled with a certain material (e.g., with a plastic). The grooves may be provided inside or outside the cross section of the second portion. Due to a selective "weakening" of the radial cross section, the mechanical properties of the plug element may be varied, for example. The plug element is more resilient in the second portion due to the provided grooves. The grooves may also be filled with plastic, whereby a possible freedom of movement may be limited.

BRIEF DESCRIPTION OF THE DRAWINGS

FIG. 1 shows a section parallel to an axis of rotation of a structure of one embodiment of a plug element;

FIG. 2 shows a section parallel to the axis of rotation of the structure or assembly of one embodiment of a plug system using plug elements of FIG. 1;

FIG. 4 shows a section parallel to the axis of rotation of a structure of a plug element in accordance with a further embodiment.

DETAILED DESCRIPTION

Figure 3:
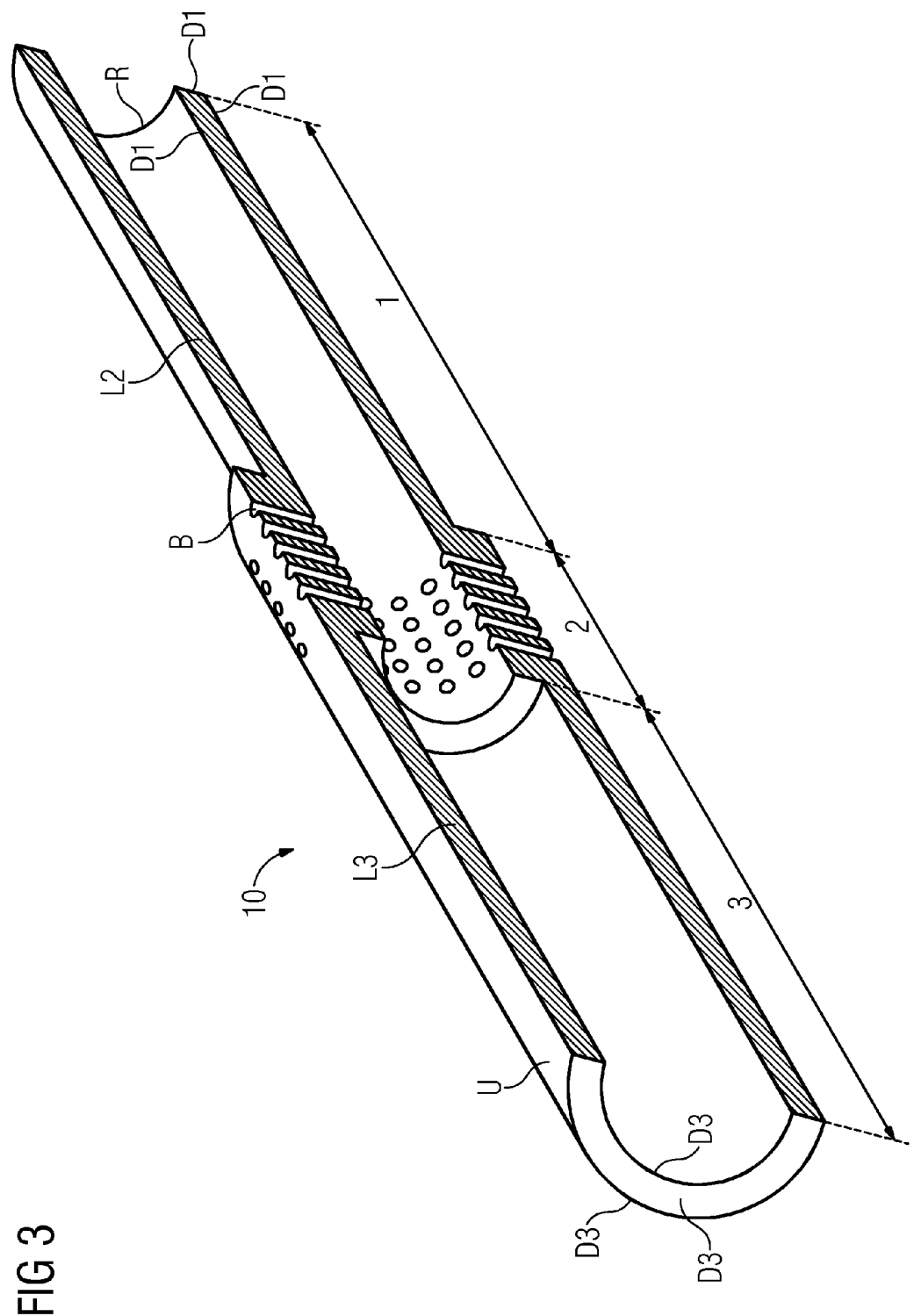
FIG. 3 shows a perspective view of a section parallel to the axis of rotation of a plug element in accordance with a further embodiment.

Same or same functioning units are provided in the figures with like or corresponding reference signs.

FIG. 1, in a sectional view symmetrical with respect to an axis of rotation, illustrates the structure of one embodiment of a plug element 10. The plug element 10 is a plug element 10 by which a cylinder capacitor C "may be plugged together." The plug element 10 is divided into three portions (e.g., a first portion 1, a second portion 2, and a third portion 3). The first portion 1 has a cylindrical shape complementary to the third portion 3. The first portion 1 maybe received fully in a third portion 3 of a further plug element 10 (see FIG. 2).

The first portion 1 has a cylindrical shape. A first electrically conductive layer L1 forms a first conductor L1, and a dielectric layer D1 is arranged coaxially therewith. The third portion 3 is also composed from a plurality of layers arranged coaxially with one another. A dielectric layer D3 is followed by a second electrically conductive layer L3, which forms a second conductor. The layer L3 forming the second conductor borders a sheathing layer U, which externally insulates the third portion 3 and the second portion 3 over the entire periphery of the plug element 10.

The dielectric layer D1 of the first portion 1 and also the dielectric layer D3 of the third portion 3 of a further plug element 10, when two plug elements 10 are plugged together, form the dielectric layer D (e.g., D1+D3) of a cylinder capacitor C, of which the structure includes a first electrically conductive layer L1 of a first conductor, a common dielectric layer D1+D3, and a second electrically conductive layer L3 of a second conductor.

The middle portion of the plug element 10 is formed by the second portion 2. The second portion 2 connects the first portion 1 to the third portion 3 and is formed such that the layer structure D2, L2, D2, U of the second portion enables a homogenous layer transition when a plurality of plug elements 10 are plugged together to form a plug system 100. A single cylindrical capacitor C, with layers of the same material and the same thickness, is thus formed.

Using the plug element 10, cylinder capacitors may therefore be constructed or plugged together. A cylinder height of the cylinder capacitor corresponds to the length of the first portion 1 of a first plug element 10 and the second portion 2 of a further plug element 10.

In an embodiment, the three line portions L1, L2 and L3 simultaneously form a line structure of an inductor. The structure of the plug system 100 corresponds in portions to a structure of a coaxial conductor.

FIG. 2 shows a sectional view (e.g., parallel to the common axis of rotation) of a plugged together structure of a plurality of plug elements 10 forming one embodiment a plug system 100. The plug system 100 includes, for example, four plug elements 10 plugged together to form a series connection of three cylinder capacitors C.

In one embodiment, the coaxial structure of the capacitor C has an outer diameter between 10 to 50 cm with, for example, a ceramic dielectric D (e.g., AL2O3) with layer thicknesses 10-50 μm. A pipe wall thickness of the electric layers or conductors L1, L3 is 5 to 20 mm. This results in high capacitance values in the range of 0.5 to 10 μF/m.

Due to the high capacitances, short resonance lengths between 0.5 to 2 mm are produced. The series resonance frequency from the inductance of a short 0.5 to 2 m portion of a forward or return conductor of the induction loop and of the upper cylinder capacitors C leads to a desired resonance frequency in the range of 10 to 200 kHz. This is associated with a comparatively low inductive voltage drop between 100 and 300 volts. This voltage is to be withstood both by the dielectric D (e.g., D1+D3) of the cylinder capacitor and by the external insulation or sheathing U with respect to the surrounding earth. For example, AL2O3 has a necessary high electric breakdown field strength of 20 to 30 KV per millimeter. Special glass films may, however, also be suitable as dielectric D.

The cylindrical structure of inner and outer electrode or of the electrically conductive layer L1 of the first portion and the electrically conductive layer L3 of the third portion with the connecting portion 2 produces the capacitor C. A coaxial portion corresponds to the line structure.

FIG. 3 illustrates an embodiment of the plug element 10 in a perspective sectional view parallel to the axis of rotation. In this embodiment of the plug element 10, the second portion 2 has radial bores B. These radial bores B enable a fluid passage, where fluid is transported from the reservoir into the interior of a through-opening R (e.g., a pipe interior; for conveying oil and bitumen) or from the pipe interior R into the reservoir (e.g., gas, water and/or salt water injection). Gas or liquid transport in the pipe interior R may also be used to cool the inductor.

FIG. 4, based on a section parallel to the axis of rotation, shows a structure of a plug element 10 in accordance with a further embodiment. The middle second portion 2 has grooves N arranged toward the pipe interior R.

Due to the grooves N, the rigidity of the individual plug element 10 or of the entire plug system 100 are influenced. Bends (e.g., with bend radii of 150 m), may be negotiated along drilling curves. At the same time, the mechanical voltages of the dielectric in the capacitor portion are reduced. In addition, however, the desired electric dielectric strength is maintained. In a further embodiment, the grooves N are filled with soft plastic. Soft plastic does not hinder bending, but leads to smooth inner and outer surfaces, which is advantageous when drawing in the inductor or in the case of fluid transport through the inductor (not shown here).

It is to be expected that, when plugging together individual plug elements 10, due to surface roughness and/or manufacturing tolerances, small to tiny air-filled gaps remain between the electrically conductive layers L1 and L3. Partial discharges may occur in the air filled gaps. Due to a special coating or covering, the cavities on the surface of the dielectric D1, D3, D may be avoided. An intermediate electrode (not shown here), with which air inclusions have no negative consequences, is produced. An ideal situation is one in which the overall layer thickness of the dielectric D (e.g., D1+D3) is composed from the two layers of the electrodes and is fully smooth, such that no air inclusions are created. A coating with graphite may additionally serve as a sliding layer when the plug elements 10 of the plug system 100 are plugged together.

A sheathing U made of plastic (e.g., PE, PVC) of the plug element 10 or plug system 100 serves as mechanical protection during installation, but does not have to meet any electrical requirements and may degrade during operation.

Further advantages of an arrangement using the plug system 100 are that the inductor continues to remain operational, even in the case of short circuit of individual capacitors C, with minimally reduced resonance frequency. Due to excellent adhesion, ceramic and high-strength Al2O3 layers, applied, for example, by plasma electrolytic oxidation (PEO) or micro-arc oxidation (MAO), enable bending at least with large radii, as are present in specified cases with oil and bitumen conveyance.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A plug system comprising:
   a plurality of plug elements for producing capacitors, each plug element of the plurality of plug elements comprising, in a longitudinal direction of the plug element, three portions, the three portions comprising a first portion, a second portion, and a third portion, wherein the first portion, at one end of the plug element, has a tapered shape that is complementary to a shape of the third portion at another end of the plug element, the other end being remote from the first portion, wherein the second portion is arranged between the first portion and the third portion, the second portion interconnecting the first portion and the third portion, wherein at least two plug elements of the plurality of plug elements are pluggable together to form the plug system, in that in each case the first portion of a first plug element of the at least two plug elements is pluggable into the third portion of a second plug element of the at least two plug elements, and wherein coaxially arranged layers of the first portion of the first plug element and coaxially arranged layers of the third portion of the second adjacent plug element supplement one another to form a coaxial layer sequence that forms a cylinder capacitor.

2. The plug system of claim 1, wherein the plurality of plug elements are pluggable together to form a series connection of capacitors, wherein the individual layers, arranged coaxially with one another in portions, of the plug system formed by the plurality of plug elements form capacitors that are electrically connected in series via the layers of electrically conductive material.

3. The plug system of claim 2, wherein the plurality of plug elements, which are pluggable together to form a series circuit of capacitors, simultaneously form a line structure of an inductor.

4. A plug element for a plug system, the plug system comprising a plurality of plug elements for producing capacitors, the plug element comprising:

in a longitudinal direction of the plug element, three portions, the three portions comprising a first portion, a second portion, and a third portion, wherein the first portion, at one end of the plug element, has a tapered shape that is complementary to a shape of the third portion at another end of the plug element, the other end being remote from the first portion, wherein the second portion is arranged between the first portion and the third portion, the second portion interconnecting the first portion and the third portion, wherein at least two plug elements of the plurality of plug elements are pluggable together to form the plug system, in that in each case the first portion of a first plug element of the at least two plug elements is pluggable into the third portion of a second plug element of the at least two plug elements, and wherein coaxially arranged layers of the first portion of the first plug element and coaxially arranged layers of the third portion of the second adjacent plug element supplement one another to form a coaxial layer sequence that forms a cylinder capacitor.

5. The plug element of claim 4, further comprising a through-opening from the one end to the other end, the through-opening being in the longitudinal direction.

6. The plug element of claim 4, wherein the plug element is rotationally symmetrical.

7. The plug element of claim 4, wherein each portion of the three portions comprises a plurality of layers of different material type arranged coaxially with one another, which differ in portions in terms of number.

8. The plug element of claim 4, further comprising radial bores provided in the second portion of the plug element.

9. The plug element of claim 8, further comprising radial grooves provided in the second portion of the plug element, the radial grooves being filled with a plastic.

10. The plug element of claim 5, wherein the plug element is rotationally symmetrical.

11. The plug element of claim 6, wherein each portion of the three portions comprises a plurality of layers of different material type arranged coaxially with one another, which differ in portions in terms of number.

12. The plug element of claim 5, further comprising radial bores provided in the second portion of the plug element.

13. The plug element of claim 6, further comprising radial bores provided in the second portion of the plug element.

14. The plug element of claim 7, further comprising radial bores provided in the second portion of the plug element.

15. The plug element of claim 4, further comprising radial grooves provided in the second portion of the plug element, the radial grooves being filled with a plastic.

16. The plug element of claim 5, further comprising radial grooves provided in the second portion of the plug element, the radial grooves being filled with a plastic.

17. The plug element of claim 6, further comprising radial grooves provided in the second portion of the plug element, the radial grooves being filled with a plastic.

18. The plug element of claim 7, further comprising radial grooves provided in the second portion of the plug element, the radial grooves being filled with a plastic.

* * * * *